United States Patent [19]
Hisaeda et al.

[11] Patent Number: 4,948,087
[45] Date of Patent: Aug. 14, 1990

[54] APPARATUS FOR PRESSURE MOLDING CERAMIC ARTICLES

[75] Inventors: Masanobu Hisaeda; Satoru Saitou; Masahiro Ogata, all of Kitakyushu, Japan

[73] Assignee: Toto Ltd., Fukuoka, Japan

[21] Appl. No.: 313,101

[22] Filed: Feb. 21, 1989

[30] Foreign Application Priority Data

Mar. 2, 1988 [JP] Japan ................................. 63-49992

[51] Int. Cl.⁵ .............................................. B28B 1/26
[52] U.S. Cl. .................................... 249/113; 249/141; 264/86; 264/302; 425/84; 425/86
[58] Field of Search .................... 249/113, 141, 137; 264/86, 302, 333, 570; 425/84, 85, 86, 429, 435

[56] References Cited

U.S. PATENT DOCUMENTS

| | | | |
|---|---|---|---|
| 3,205,291 | 9/1965 | Derror | 264/86 |
| 3,536,799 | 10/1970 | Spy | 264/86 |
| 3,550,224 | 12/1970 | Gram et al. | 264/302 |
| 3,663,681 | 5/1972 | Ehrlich | 264/86 |
| 3,691,266 | 9/1972 | Greenberg | 425/84 |
| 3,781,157 | 12/1973 | Maringer et al. | 249/137 |
| 3,792,149 | 2/1974 | Derror | 249/137 |
| 4,361,307 | 11/1982 | Benavidez | 249/137 |
| 4,798,525 | 1/1989 | Sato et al. | 425/85 |

FOREIGN PATENT DOCUMENTS

| | | | |
|---|---|---|---|
| 2002428 | 7/1971 | Fed. Rep. of Germany | 425/84 |
| 2657177 | 6/1978 | Fed. Rep. of Germany | 425/84 |
| 2437777 | 6/1980 | France | 425/84 |
| 1150072 | 4/1985 | U.S.S.R. | 249/141 |
| 1359684 | 7/1974 | United Kingdom . | |
| 1425734 | 2/1976 | United Kingdom | 425/84 |

Primary Examiner—C. Scott Bushey
Attorney, Agent, or Firm—Jordan and Hamburg

[57] ABSTRACT

An apparatus for pressure molding ceramic articles includes at least one split mold including a core mold and an outer mold which are joined together for defining a pressure mold cavity therebetween. At least the bottom surface of the pressure mold cavity is inclined longitudinally and laterally, while the split mold per se is not inclined and the slip supply passage for supplying the slip into the pressure mold cavity communicates with the lowermost end of the pressure mold cavity. Due to the above construction, it is no longer necessary to incline the entirety of the split molds so that the frame structure of the apparatus can be vertically constructed on a horizontal floor which permits easy construction installation and adjustment and maintenance of the apparatus. Furthermore, since the bottom surface of the pressure mold cavity is inclined longitudinally and laterally, the surplus slip is discharged completely and smoothly, and does not remain in the pressure mold cavity. Accordingly, molded articles of high-quality and uniform thickness can be obtained.

4 Claims, 10 Drawing Sheets

APPARATUS FOR PRESSURE MOLDING CERAMIC ARTICLES

BACKGROUND OF THE INVENTION

This invention relates to an apparatus for pressure molding ceramic articles highly efficiently to produce ceramic articles of high quality.

One of the conventional apparatuses for pressure molding of ceramic articles has been disclosed in the British Patent Specification No. 1359684.

The slip-casting apparatus according to the British Patent substantially comprises a split mold which is formed by combining two separable parts consisting of a male part and a female part, each having permeability. The split mold defines a pressure mold cavity between the male part and the female part. Liquid slip is introduced into the pressure mold cavity through a slip supply duct and after adhering to the inner walls of the male part and the female part with a sufficient thickness, non-adhered surplus slip is forced out of the pressure mold cavity through a surplus slip drain orifice which is provided separately. Ceramic articles are, thus, produced in the pressure mold cavity.

In the above construction, the split mold comprising the male part and the female part is inclined longitudinally and laterally in its entirety, allowing the surplus slip readily to flow towards the surplus slip drain orifice situated in a bottom corner position of the mold.

In order to produce a plurality of molded articles in one molding operation, the British Patent Specification has also disclosed such an arrangement that a plurality of split molds are connected in tandem and are mounted movably on a mold supporting frame.

Due to the above construction, the molded articles can be considered to be produced on a mass production basis.

However, the above apparatus for pressure molding ceramic articles still has the following problems to be solved:

(1) For collecting the surplus slip towards the surplus slip drain orifice, the split mold per se must be inclined longitudinally and laterally in its entirety, and therefore the mold supporting frame or the floor for installiling such frame must be also inclined, resulting in the apparatus having a complicated and large-sized construction which leads to the high production and installation cost.

(2) In the pressure molding apparatus which is constructed by connecting a plurality of split molds each consisting of a combination of the male part and the female part, each mold is so heavy that the separation of the male and female parts requires a considerable amount of force.

Accordingly, the manual separation imposes hard labor on workers. Although using of a hydraulic cylinder or a plurality of cylinders is considered for the separation of the male part and female part, such cylinders inevitably must withstand heavy duty and accordingly become large-sized and the mold supporting frame in which such a hydraulic cylinder is installed must be large-sized as well.

(3) In the pressure molding apparatus which is constructed by connecting a plurality of split molds each consisting of a combination of the male part and the female part, there is no connection between the surplus slip drain orifices provided on each mold, and each drain orifice independently communicates with slip deposits to be discharged through a slip drain piping, causing an intricate slip drain piping and troublesome maintenance.

(4) A slip supply passage and a surplus slip drain orifice must be provided on each split mold which is made of a combination of the male part and the female part so that the production cost of split molds becomes extremely high and the maintenance of the split mold including the opening of the clogged passage and orifice becomes cumbersome.

(5) For collecting the surplus slip towards the surplus slip drain orifice, the split mold per se must be inclined longitudinally and laterally in its entirety, and therefore it is extremely difficult to adjust the inclining angle to an angle which is most suitable for collecting of the surplus slip.

Accordingly, it is an object of this invention to provide an apparatus for pressure molding ceramic articles in which the above problems are solved, wherein, the surplus slip can be readily discharged by inclining the pressure mold cavity longitudinally and laterally without inclining the entirety of the split mold, thus enabling the pressure molding apparatus to be as compact and simple as possible.

The second object of this invention is to provide an apparatus for pressure molding ceramic articles in which the construction of the split mold can be made as compact as possible by utilizing the slip supply passage also as a surplus slip drainage, whereby the split molds can be produced inexpensively.

The third object of this invention is to provide an apparatus for pressure molding ceramic articles in which a plurality of split molds are pressed into contact with each other making the slip supply passages of all the slip molds communicate with one another, thereby facilitating the feeding of the slip to the pressure mold cavity and the discharging of the surplus slip therefrom.

The fourth object of this invention is to provide an apparatus for pressure molding ceramic articles in which a spring is interposed between each two neighboring or adjacent split molds for facilitating the separating of the split molds from each other which leads to the separation of a core mold and an outer mold. Accordingly, the removal of the molded articles can be performed easily.

SUMMARY OF THE INVENTION

This invention provides an apparatus for pressure molding ceramic articles in which the apparatus includes at least one split mold consisting of a core mold and an outer mold which are joined together for defining a pressure mold cavity therebetween, and the bottom surface of the pressure mold cavity is inclined longitudinally and laterally, and the slip supply passage for supplying the slip into the pressure mold cavity communicates with the lowermost end of the pressure mold cavity.

This invention also provides an apparatus for pressure molding ceramic articles in which the apparatus includes a plurality of split molds, each of which consists of a core mold and an outer mold which are joined together for defining a pressure mold cavity therebetween, and the bottom surface of the pressure mold cavity is inclined longitudinally and laterally, and the slip supply passage for supplying the slip into the pressure mold cavity communicates with the lowermost end of the pressure mold cavity, and a mold-separating and impact-absorbing spring is interposed between each two adjacent split molds.

Due to the above construction, this invention has the following advantages:

(1) Since the bottom surface of the pressure mold cavity is inclined longitudinally and laterally, it is no longer necessary to incline the entirety of the split molds. While constructing the frame structure of the apparatus vertically on a horizontal floor which permits easy construction, installation and adjustment, the bottom surface of the pressure mold cavity can be inclined longitudinally and laterally so that the surplus slip is discharged completely and smoothly, and does not remain in the pressure mold cavity. Accordingly, molded articles of high-quality and uniform thickness can be obtained.

(2) When the pressure applied by a mold clamping hydraulic device is released for separating the split molds, the mold-separating and impact-absorbing springs which are held in a compressed condition generate a biasing force to open the abutting surfaces of the core mold and the outer mold, and the molded article is taken out from the outer mold or the core mold. Accordingly, water does not return to the molded article from the outer mold and the core mold, thus preventing erosion on the surface of the molded article and deformation there of during a removal operation.

Furthermore, during a mold clamping operation, an impact which occurs when the molds contact each other is absorbed and relieved by the mold-separating and impact-absorbing springs.

(3) Since the slip passages are brought into communication with one another by clamping the molds, it is unnecessary to provide a plurality of slip pipings which are to be connected to the slip passages of the respective molds and therefore the construction of the split molds can be made further compact. Even if one or a plurality of the slip passages are clogged due to the precipitation of the slip therein, the cleaning operation can be easily performed since all the slip passages are in alignment with each other.

DETAILED DESCRIPTION OF PREFERRED EMBODIMENTS OF THE INVENTION

An embodiment of the present invention will now be described in detail with reference to the drawings.

Figure 1:
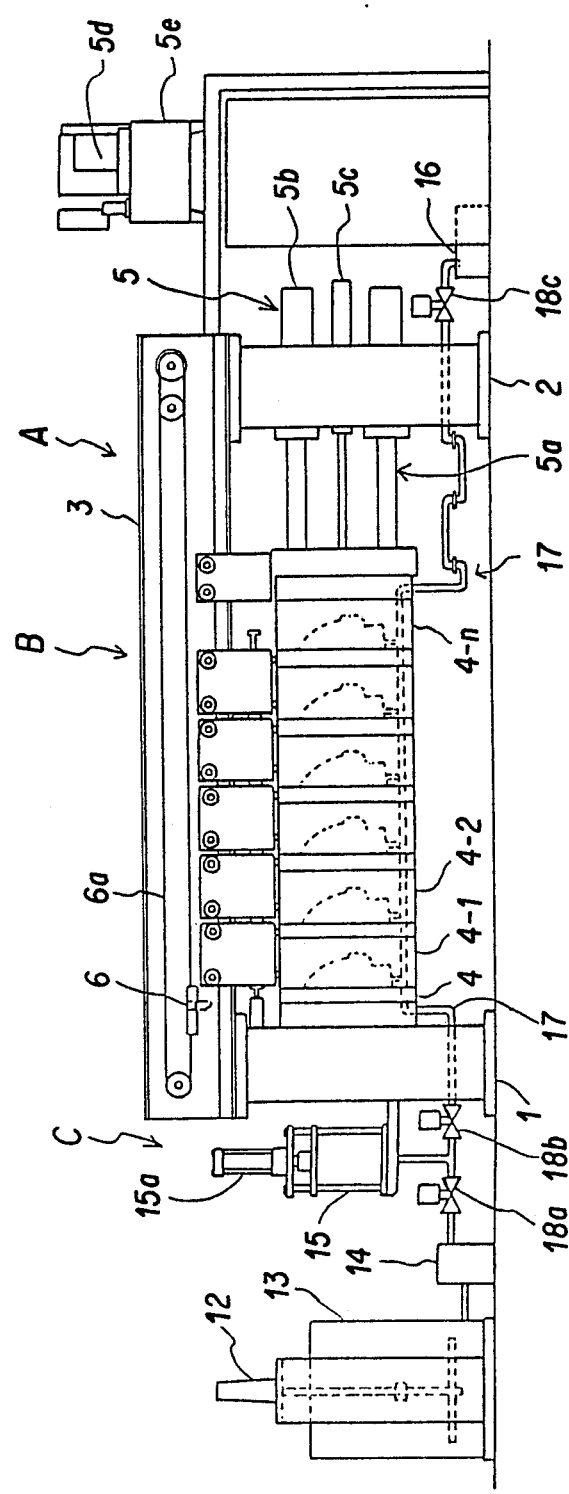
FIG. 1 is a front elevation showing the construction of the ceramic articles or earthenware pressure molding apparatus according to the present invention.
Figure 3:
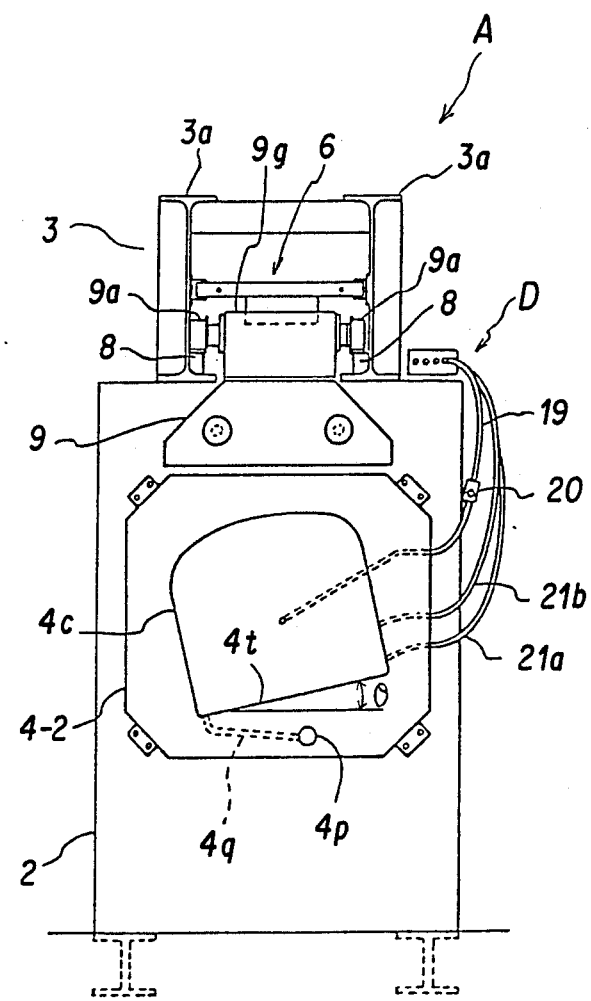
FIG. 3 is a section view taken along the line I—I in FIG. 2.
Figure 8:
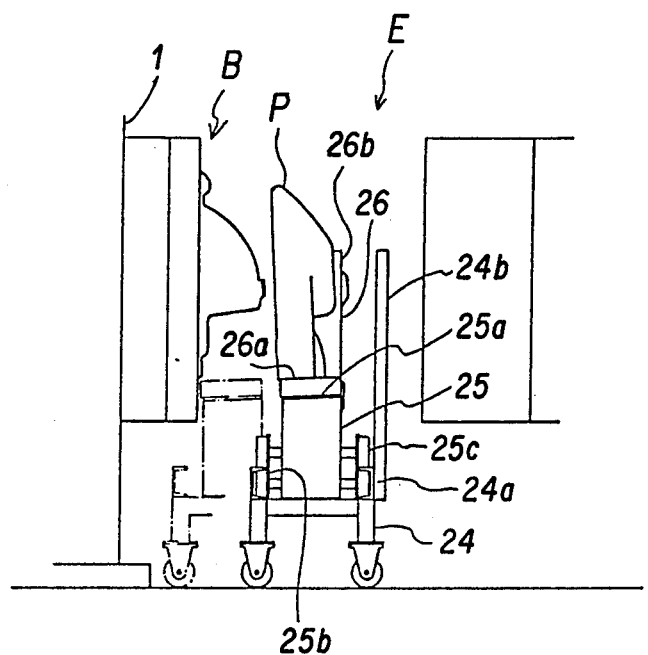
FIG. 8 is a front elevation of a carry-out unit.

FIG. 1 is a front elevation showing the construction of the present invention, in which a reference letter A denotes a ceramic articles pressure molding apparatus consisting mainly of an apparatus body B and a slurry treatment unit C; the apparatus also includes an air dehydrator D and a carry-out unit E which are shown in FIGS. 3 and 8, respectively.

Figure 2:
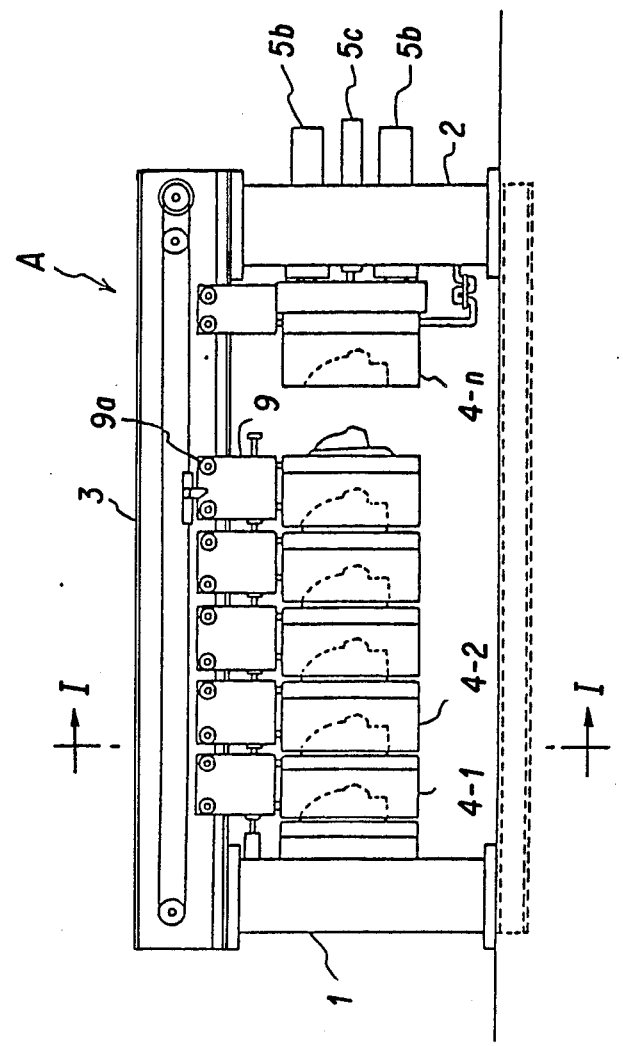
FIG. 2 is a front elevation of a apparatus body.

As shown in FIGS. 1 and 2, the apparatus body B has a horizontal frame 3 supported between the upper portions of left and right columns 1, 2, and a plurality of movable molding boxes 4-1, 4-2 . . . 4-n, each of which forms a split mold as described later, are suspended from the horizontal frame 3 so that these molding boxes can be moved in the lengthwise direction of the horizontal frame 3.

One column 1 is provided with a fixed molding box 4, while the other column 2 is provided with a hydraulic unit 5 by which the movable molding boxes 4-1, 4-2 . . . 4-n are pressed so as to be clamped all at one time.

As shown in FIG. 3, the horizontal frame 3 has two I-shaped steel members 3a, 3a arranged in parallel with each other, longitudinal rails 8, 8 fixed to the side surfaces of the webs of the I-shaped steel members 3a, 3a and suspension frames 9, 9 . . . joined to the upper portions of the movable molding boxes 4-1, 4-2 . . . 4-n and supported at the rollers 9a thereof on these rails 8, 8 so that the rollers 9a can be rotated thereon, whereby the molding boxes 4-1, 4-2 . . . 4-n are suspended from the horizontal frame 3 so that the molding boxes can be moved laterally along the horizontal frame 3.

Figure 4:
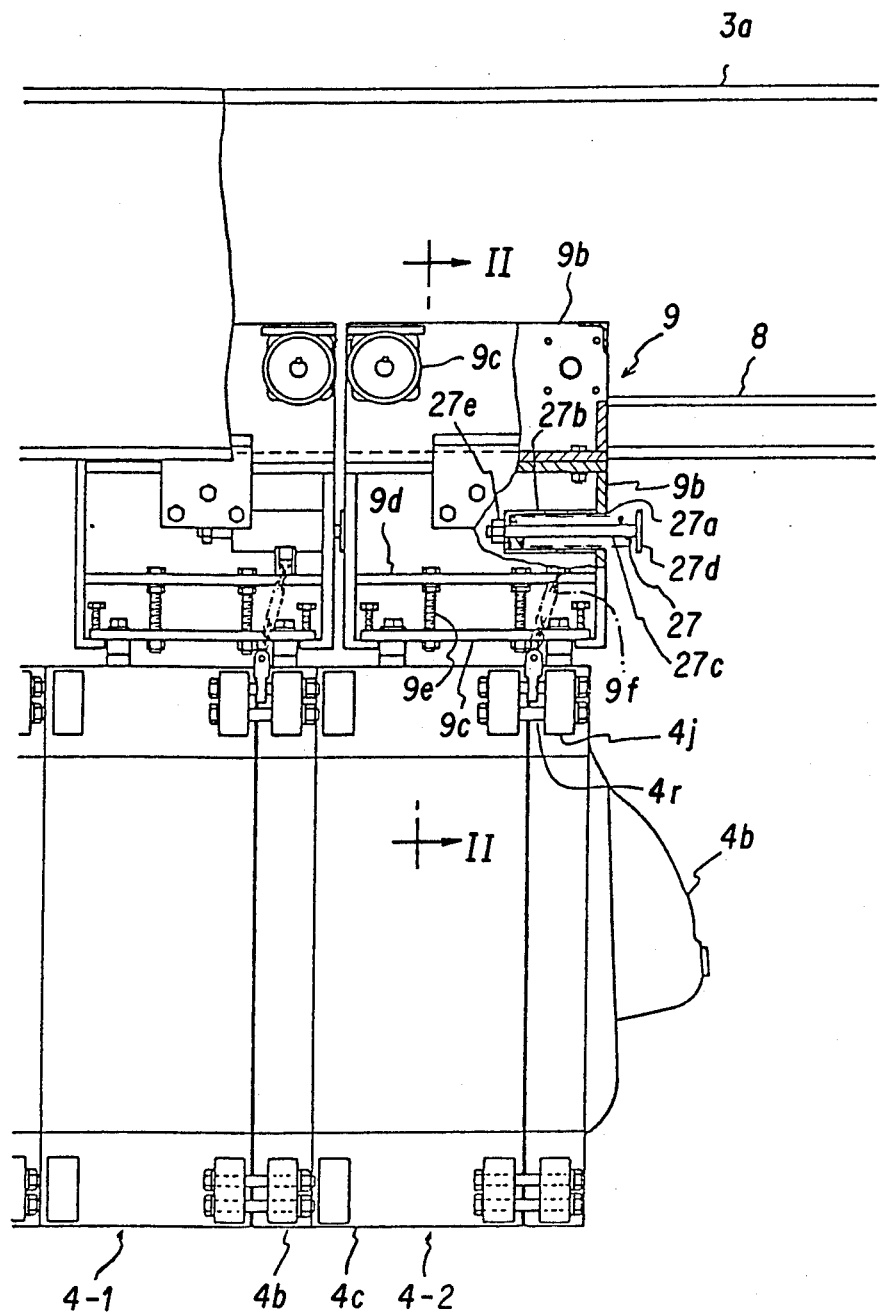
FIG. 4 is a partially sectioned front elevation of molding boxes and suspension frames.
Figure 5:
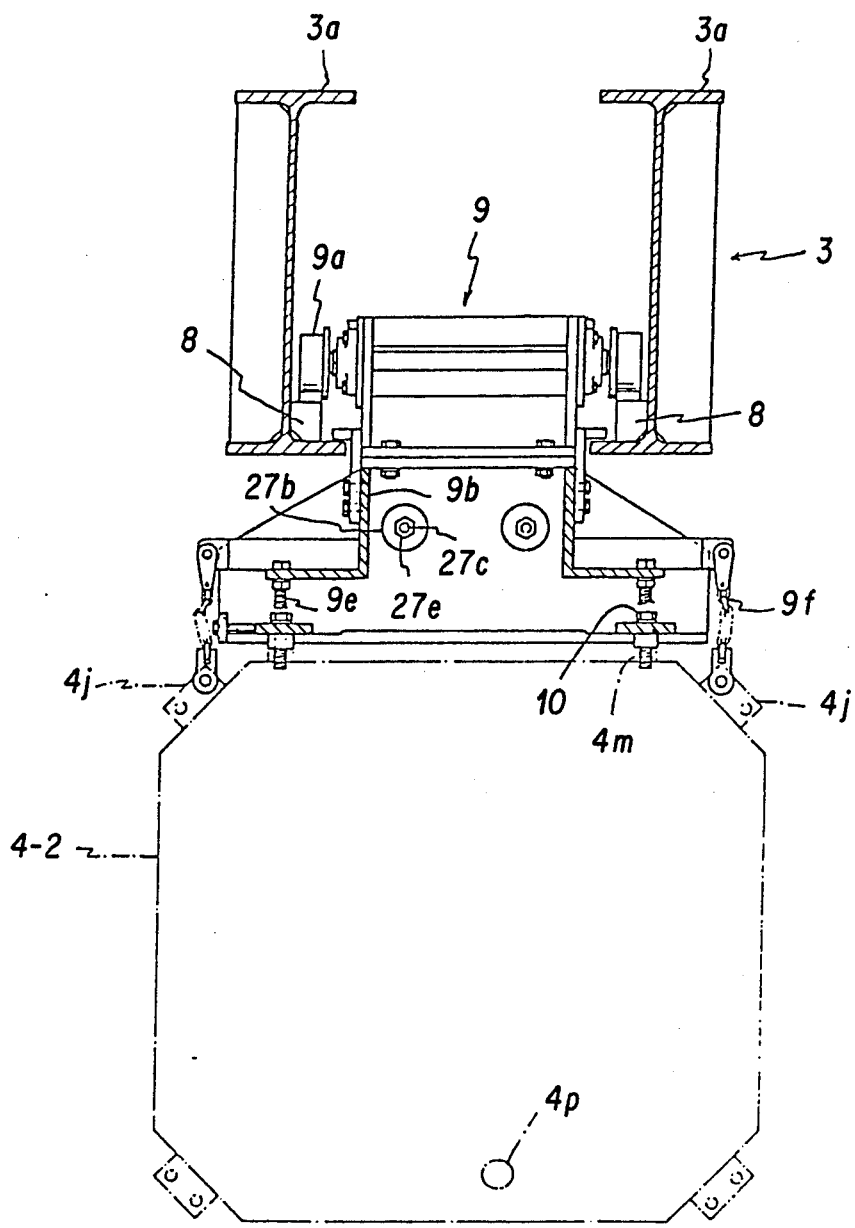
FIG. 5 is a sectional view taken along the line II—II in FIG. 4.

As shown in FIGS. 4 and 5, the suspension frames 9, 9 have molding box support members 9c, from which the molding boxes 4-1, 4-2 . . . 4-n are suspended, on the lower surfaces of the suspension frame bodies 9b which are formed substantially to the shape of a box, and these molding box support members 9c are supported by stay bolts 9e inserted through stationary members 9d fixed to the intermediate portions of the inner surfaces of the suspension frame bodies 9b so that the vertical positions of the movable molding boxes 4-1, 4-2 . . . 4-n with respect to the suspension frame bodies 9b can be regulated.

Figure 6:
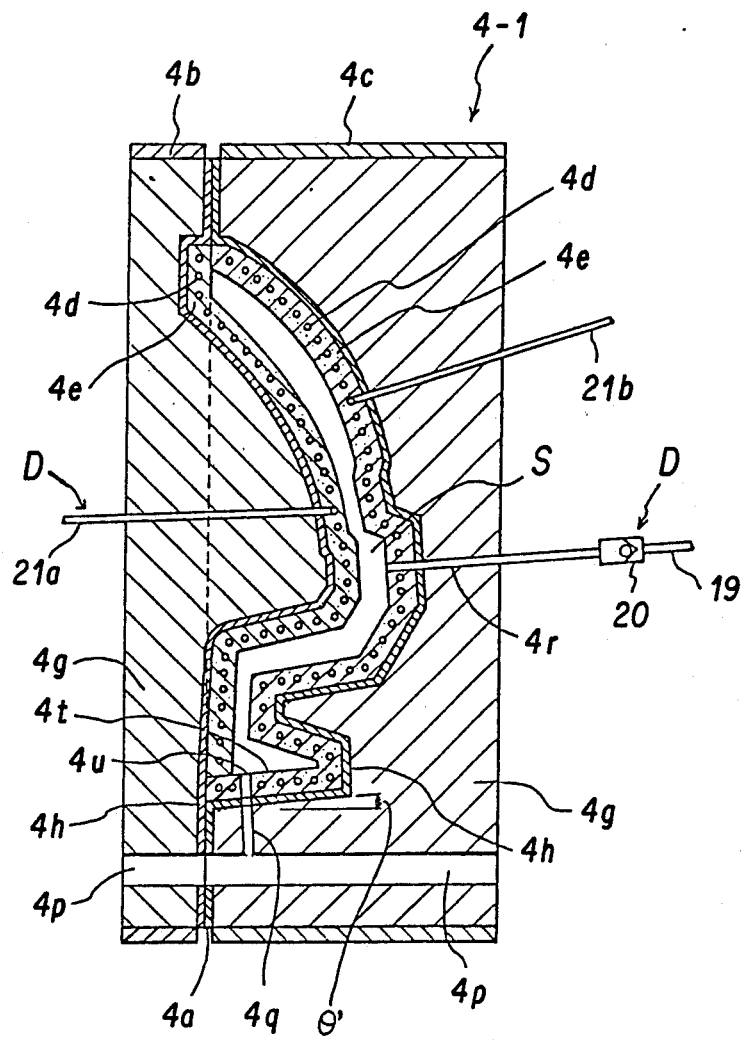
FIG. 6 is a sectioned front elevation of a molding box.
Figure 7:
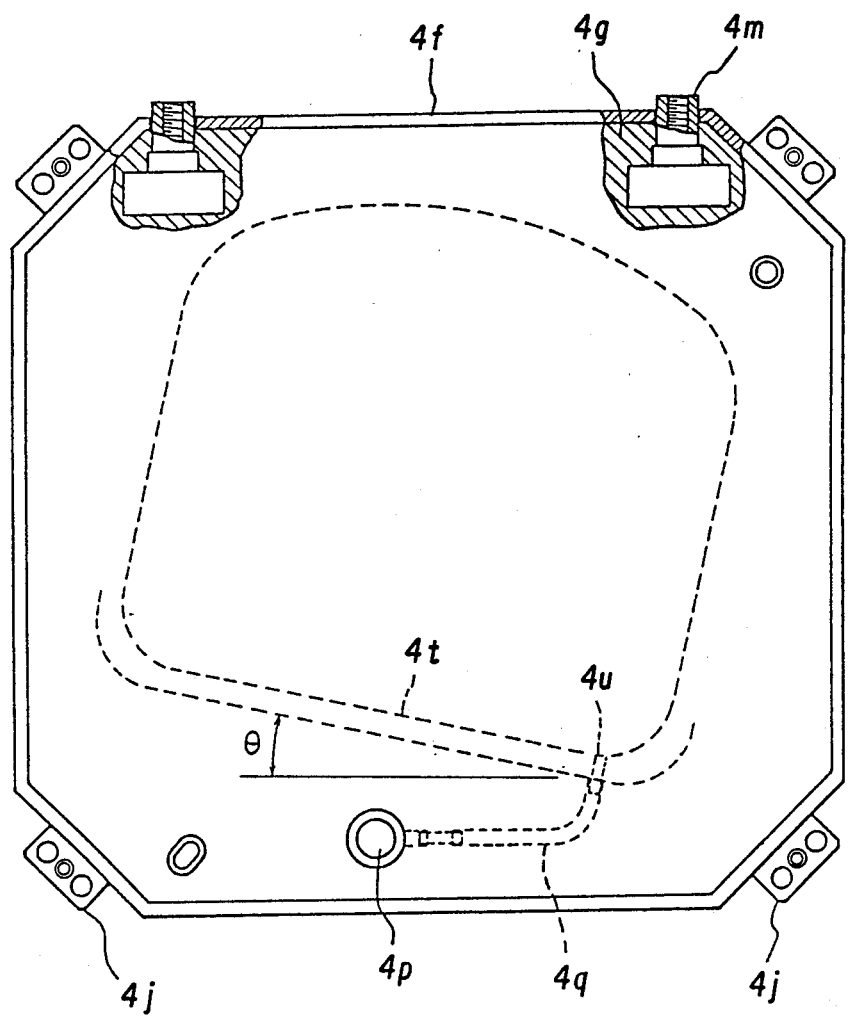
FIG. 7 is a partially sectioned side elevation of the molding box.

Referring to the drawings, reference numeral 9f denotes safety chains. Each of the movable molding boxes 4-1, 4-2 . . . 4-n consists of a core mold 4b and an outer mold 4c as shown in FIGS. 6 and 7. If the core mold 4b and outer mold 4c in the adjacent molding boxes are combined unitarily at the mold matching surfaces 4a by a mold clamping operation, a pressure mold cavity S is formed between these molds closed at the mold matching surfaces 4a.

Especially, the fixed molding box 4 and movable molding boxes 4-1, 4-2 . . . 4-n are provided with slurry passages 4p extending laterally through the same portions of the lower sections thereof so that the left and right mold matching surfaces 4a communicate with each other, and the lower end portions of the pressure mold cavities S communicate with this passage 4p via branch passages 4q provided in the interior of the molding boxes.

Therefore, when the molding boxes 4, 4-1, 4-2 . . . 4-n are clamped, the slurry passages 4p therein form a continuous, linearly communicating slurry passage, which is used to charge and discharge slurry into and from the molds, in the interior of the unitarily clamped molding boxes. Since this passage is linearly formed, the slurry flows therethrough excellently, so that the passage is rarely clogged therewith. If the passage should be clogged with the slurry, it can be cleaned easily after the molds have been parted. Since the slurry is charged into and discharged from the molds through the slurry passages 4p and branch passages 4q in the interior of the molding boxes, it is unnecessary that a slurry pipe be provided in each molding box, and this enables the construction of the pressure molding apparatus to be simplified.

The slurry contacting surfaces of the core and outer molds have a substantially uniform thickness, and consist of porous members 4e having water and air passages 4d. Filler members 4g consisting of mortar are packed in the spaces between the rear surfaces of the porous members 4e and an iron frame 4f provided for supporting the porous members 4e, and resin layers 4h for cutting off the flow of water and air are provided between the boundary surfaces of the porous members 4e and filler members 4g and on the mold matching surfaces 4a.

As shown in FIGS. 3, 6 and 7, the core and outer molds 4b, 4c are inclined at an angle $\theta'$ in the longitudinal direction with respect to the iron frame 4f so as to incline the bottom surface 4t at the lower portion of the pressure mold cavity S so that the pressure mold cavity S has a single lowermost portion 4u, with which the branch passage 4q communicates to prevent the slurry from residing in the pressure mold cavity S molding hollow S during an excess slurry discharging operation.

Figure 9:
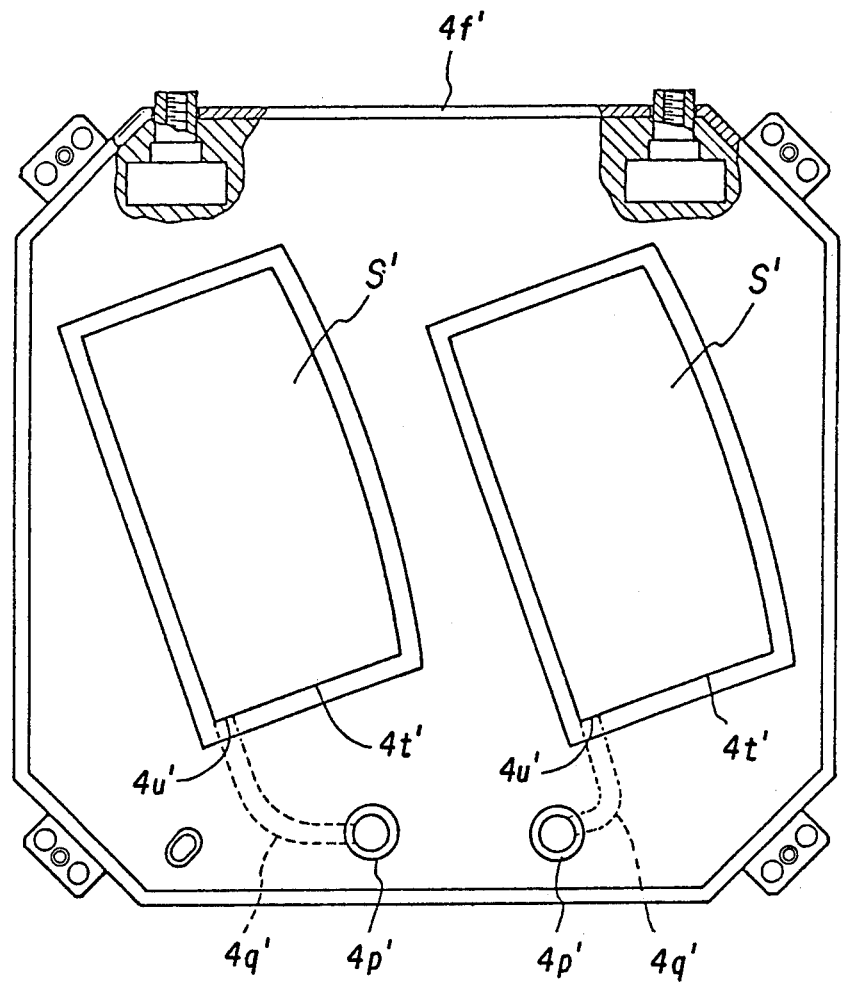
FIG. 9 is a side elevation of another example of a molding box.
Figure 10:
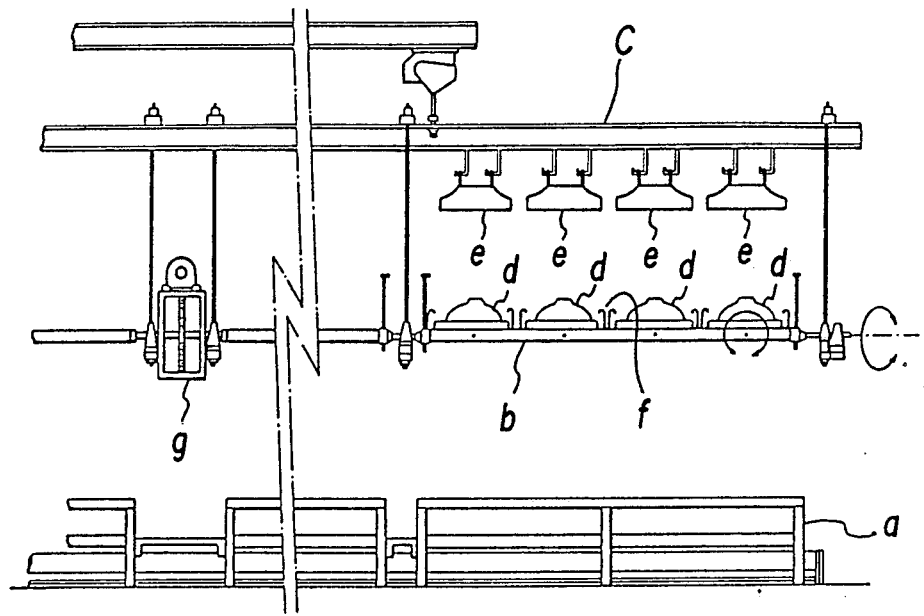
FIG. 10 is a schematic view showing the construction of a conventional casting apparatus as a whole.

FIG. 9 shows a molding box in which a plurality of the pressure mold cavities S', S' are provided. These pressure mold cavities S', S' are also inclined longitudinally and laterally with respect to an iron frame 4f' so as to incline the bottom surfaces 4t', 4t' of the lower portions of the cavities S', S' so that the cavities S', S' have each one lowermost portion 4u', 4u'. Branch passages 4q', 4q' are communicate between the lowermost portions 4u', 4u' and slurry passages 4p', 4p' and prevent the slurry from residing in the cavities S', S' during an excess slurry discharging operation.

Owing to such construction, it is unnecessary to provide a slurry pipe in each molding box, and a means for inclining the core and outer molds 4b, 4c with respect to an iron frame 4f does not require to be provided additionally. This enables the molding apparatus as a whole to be made compact.

The movable molding boxes 4-1, 4-2 . . . 4-n consisting of the core and outer molds 4b, 4c respectively are fastened to the apparatus body B in the following manner (refer to FIGS. 1, 4 and 5).

The molding box 4 to which a core mold 4b only is attached is fixed to the inner surface of the column 1 on which the hydraulic unit 5 is not provided, with the effective surface of the core mold directed inward.

The molding boxes 4-1, 4-2 . . . 4-n are arranged so that the rear sides of the core and outer molds 4b, 4c contact each other, i.e., in such a manner that the effective surfaces of these molds 4b, 4c are directed outward. The movable molding boxes 4-1, 4-2 . . . 4-n which are combined unitarily by the connecting bolts 4r inserted through the lugs 4j provided at the four cornes of the iron frames 4f are suspended movably from the horizontal frame 3 in the apparatus body B via the suspension frames 9, 9 . . . by engaging suspension bolts 10, which are passed through the molding box support members 9c, with threaded bores 4m provided in the upper portions of the iron frames 4f.

The movable molding box 4-n closest to the hydraulic unit 5 is disposed with the inwardly directed outer mold 4c alone set therein, and the rams 5a in main and auxiliary cylinders 5b, 5c in the hydraulic unit 5 are joined to the rear surface of the mold 4c, the molding boxes 4-1, 4-2 . . . 4-n being clamped by the hydraulic unit 5.

The mold parting and shock absorbing springs 27 are provided, especially, on the inner surface of the column 1, on which the fixed molding box 4 is provided, and the suspension frames 9 so that the mold matching surfaces 4a of the molding boxes can be opened automatically when the molds have been released from the mold clamping force. As shown in FIG. 4, a spring inserting bore 27a is made in a side wall of a suspension frame 9, and a spring support cylinder 27b projects from the portion of the inner side surface of the suspension frame 9 which is around the circumferential edge of the bore 27a, the spring 27 being housed in this cylinder 27b. A bolt 27c is inserted through the bottom wall provided at the inner end of the cylinder 27b, and a contact member 27d is joined to the outer end of the bolt 27c. The outer end of the spring 27 is engaged with the contact member 27d. Owing to the resilient force of the spring 27, the adjacent movable suspension frame 9 is pressed rightward. A nut 27e is screwed on the inner end portion of the bolt 27c to limit the expansion of the spring 27.

The hydraulic unit 5 consists of four large-diameter main cylinders 5b and a small-diameter auxiliary cylinder 5c provided in a position equally spaced from the four main cylinders 5b, which cylinders 5b, 5c are passed through the column 2; a hydraulic pump 5d; and an oil tank 5e.

The large-diameter main cylinders 5b are used only in a final part, in which the mold clamping pressure is high, of a mold clamping operation, and the small-diameter auxiliary cylinder 5c in the other stage of the mold clamping operation and while the molding boxes are moved. Accordingly, a hydraulic pump 5d of even a comparatively small capacity is capable of increasing the molding box moving speed.

The horizontal frame 3 is provided with a molding box transfer unit 6 adapted to be moved in accordance with turning movement of a transfer chain 6a disposed in parallel with the horizontal frame 3, so as to transfer the molding boxes 4-1, 4-2 . . . 4-n one by one toward the hydraulic unit 5 after the molds have been released from the mold clamping force.

As shown in FIG. 1, the slurry treatment unit C consists of a slurry tank 13 having an agitator 12, a slurry pump 14, and a slurry pressurizing unit 15 driven by a hydraulic cylinder 15a, all of which are provided at one side of the apparatus body B, and a discharged slurry receiving tank 16 provided at the other side of the apparatus body B, slurry pipes 17 by which all of the above constituent elements are connected together, and first, second and third electric valves 18a, 18b, 18c provided at the intermediate portions of the pipes 17.

The slurry in the slurry tank 13 is sent under pressure by the slurry pump 14 to the slurry pressurizing unit 15 through the first electric valve 18a, and then to the pressure mold cavities S in the clamped molding boxes 4, 4-1, 4-2 . . . 4-n through the second electric valve 18b.

The slurry flows into the molding boxes 4, 4-1, 4-2 . . . 4-n through the slurry passages 4p provided in the core and outer molds 4b, 4c and formed into a continuous slurry passage when the molds are clamped.

As shown in FIGS. 3 and 6, the air dehydrator D is formed so that the hoses 21a, 21b connected to a compressor (not shown) through an electromagnetic valve (not shown) communicate with the air and water passages 4d, 4d in the core and outer molds 4b, 4c so as to dehydrate the molded products formed on the surfaces of the core and outer molds 4b, 4c.

An air hose 19 joined to a compressor (not shown) via the solenoid valve (not shown) communicates with an air passage 4r. After the slurry has been charged into the molds, a deposited mass of a predetermined thickness is formed on the surfaces of the core and outer molds 4b, 4c, and the pressurized air is then introduced into the molding hollows to discharge the excess slurry therefrom.

Referring to the FIG. 3, a reference numeral 20 denotes a check valve for use in preventing the slurry from flowing into the air hose 19.

As shown in FIG. 8, the carry-out unit E consists of a laterally movable carriage 24 provided in a position at the front side of and suitably spaced from the apparatus body B and capable of being moved in parallel with the horizontal frame 3, a longtudinally movable carriage 25 capable of being moved in the longitudinal direction on the carriage 24, and a molded product receiving table 26 placed on the carriage 25.

The longtudinally movable carriage 25 is provided so that it can be moved on the upper surface of the laterally movable carriage 24 in the direction which crosses the lengthwise direction of the apparatus body B at right angles thereto, i.e., in the longitudinal direction, and front and rear legs are provided so as to extend downward from the front and rear end portions of a substantially square carriage frame 25a used to place the product receiving table 26 thereon, front and rear wheels 25b, 25c being attached to the lower ends of these four legs. The front and rear legs are formed to different lengths, and the front wheels 25b are rotated in the cross-sectionally C-shaped recesses, the rear wheels 25c being rotated on the upper surface of a carriage frame 24a.

Accordingly, when the carriage 25 is moved to a position below the horizontal frame 3, the upper surface of the carriage frame 25a is inclined at $\theta$ which is an angle of inclination of the bottom surface 4t at the lower portion of the pressure mold cavity S with respect to the molding box.

When the longitudinally movable carriage 25 is moved back to cause the rear wheels 25c to run on a substantially trapezoidal inclined runway provided on the rear half portion of the upper surface of the carriage frame 24a, the upper surface of the carriage frame 25a in the rear position becomes horizontal.

Referring to the drawings, reference numeral 24b denotes a handle bar used to move the longitudinally movable carriage 24.

The molded product receiving table 26 is provided with a vertical molded product receiving plate 26b on the upper surface of a substantially thick plate type seat 26a, and formed to such a shape that enables the molded product P, which has been molded in the core and outer molds 4b, 4c, to be supported thereon without deforming and hurting the product. The shape of this molded product receiving plate 26b varies depending upon the kind of the molded product P.

The embodiment of the present invention is constructed as described above, and the ceramic-articles or earthenware molding operation has been carried out in the following order.

In a preparation step, the agitator 12 in the slurry tank 13, a compressor (not shown) in the air dehydrator D, and the hydraulic pump 5d in the hydraulic unit 5 are started to set uniform the density of the slurry in the tank 13, and retain the air pressure and hydraulic pressure at required levels.

A mold clamping operation is then carried out. First, the auxiliary cylinder 5c is extended to move the molding boxes 4-1, 4-2 . . . 4-n toward the fixed molding box 4 attached to the column 1 and bring the adjacent molding boxes 4, 4-1, 4-2 . . . 4-n into contact with each other. The four main cylinders 5b are then extended to forcibly press the molding boxes 4, 4-1, 4-2 . . . 4-n against one another and form the pressure mold cavities S.

Especially, when the molding boxes 4, 4-1, 4-2 . . . 4-n are brought into contact with one another, the impact ocurring at this time is lessened owing to the mold parting and shock absorbing springs 27.

The injection of slurry is then carried out. The first, second and third electric valves 18a, 18b, 18c are opened to operate the slurry pump 14 and send out slurry to the discharged slurry receiving tank 16 through the slurry pipe 17 and slurry passage 4p for required standby time. Consequently, the slurry flows to the branch passages 4q in the molding boxes, and a subsequent operation, i.e. the injection of slurry into the pressure mold cavities S in the molding boxes, starts simultaneously.

When the third electromagnetic valve 18c is then closed with the slurry pump 14 left operating, the slurry is injected into the pressure mold cavities S. After a required period of time has elapsed, the pressure mold cavities S are filled with the slurry.

The pressurization of the slurry is then carried out. The hydraulic cylinder 15a in the slurry pressurizing unit 15 is extended with the first and third elelctric valves 18a, 18c closed and the second electric valve 18b opened, to send the slurry under high pressure into the pressure mold cavities S and retain the slurry for required standby time. Only the water in the slurry is transmission-discharged through the porous members 4e in the intermediate and outer molds 4b, 4c whereby the slurry is deposited to a predetermined thickness on the surfaces of the molds 4b, 4c.

The discharging of the excess slurry is then done as follows. Air of a predetermined pressure is introduced from the compressor into the pressure mold cavities S through the air hoses 19 and the air passages 4r provided in the outer molds 4c with the second electric valve 18b closed and the third electric valve 18c opened, and this condition is held for a predetermined period of time.

The excess slurry, which was not deposited on the core and outer molds 4b, 4c is then discharged to the discharged slurry receiving tank 16 through the branch passages 4q, slurry passage 4p and slurry discharge pipe 17.

During such an excess slurry discharging operation, the excess slurry is discharged smoothly and effectively through the slurry passages 4p since the bottom surfaces 4t at the lower portions of the pressure mold cavities S are inclined in advance with respect to the fixed and movable molding boxes 4, 4-1, 4-2 . . . 4-n, i.e., the excess slurry discharging operation can be carried out smoothly without tilting the core and outer molds 4b, 4c by using an additionally provided driving means.

The blowing of the air, which is referred to above, is continued with the second and third electric valves 18b, 18c closed, and this condition is retained for a required period of standby time to discharge the water which is contained in the ceramic articles or earthen material deposited on the surfaces of the intermediate and outer molds 4b, 4c to the outside through the porous members 4e and passages 4d and complete the pressure molding operation in the pressure mold cavities S.

The molded products P thus molded in the pressure mold cavities S are taken out by parting the molds. The removal of the products P is carried out by stopping the supplying of the pressure air from the air hoses 19 to return the pressure in the pressure mold cavities S to atmospheric pressure, stopping the operation of the main cylinders 5b, reducing the pressure in the hoses 21a, which communicate with the passages 4d in the core molds 4b to make the molded products P adhere to the core molds 4b, introducing pressurized air into the hoses 21b, which communicate with the passages 4d in the outer molds 4c, to pass out the water from the porous members 4e and make the molded products P ready to be removed from the molds, and retracting the piston of the auxiliary cylinder 5c to move the extreme right molding box 4-n to the right and cause a clearance between this molding box and the adjacent movable molding box to increase and clearances to occur at the same time among the molding boxes 4, 4-1, 4-2 . . . 4-n owing to the mold-parting and shock-absorbing springs 27 provided on the same molding boxes, whereby the bad influence upon the molded products P of the returning of the water from the porous members 4e in the outer molds 4c is prevented.

During this time, the molded products P stick to the core molds 4b projecting from the side surfaces of the molding boxes, so that a subsequent step of removing the molded products P from the molds and sending out the same to the outside can be carried out easily.

The molded products P are then removed from the molds and sent out to the outside. This operation is carried out manually by moving the laterally movable carriage 24 in the carry-out unit E to the position shown in FIG. 8, moving the longitudinally movable carriage 25 on which the molded product receiving table 26 is placed to the position just in front of an core mold 4b, moving the laterally movable carriage 24 toward the core mold 4b to support the product P on the molded product receiving table 26, and stopping the reduction of the pressure in the hose 21a, which communicates with the passage 4d in the core mold 4b attached to the second molding box from the right end of the row of molding boxes, by introducing pressurized air into the hose 21a, thereby to cause the water to ooze out from the porous members 4e in the core mold 4b, and removing the molded product P from the core mold 4b.

The carriages 24, 25 are then moved in the order opposite to the order mentioned above, to carry the molds, from which the molded product has just been taken out, to the outside.

The second movable molding box from the right end of the row of molding boxes is then moved to right, and the molded product P is removed from the third movable molding box. This operation is carried out by turning the transfer chain 6g in the molding box transfer unit 6 to the left to move the molding box to the right and increase the distance between the second and third molding boxes from the right end of the row of molding boxes, the molded product P being then sent out to the outside as mentioned above.

After the molded products P have been carried out to the outside from all the molding boxes 4, 4-1, 4-2 . . . 4-n-1 by repeating the above-described operations, a subsequent molding operation which starts with a mold clamping step is started.

In the above-described molding operation, all the steps except the steps, which require delicate handling operations, of removing a molded product from the molds and carrying out the same to the outside, can be controlled automatically by simple sequential operations, so that the amount of manual work can be greatly reduced.

The embodiment of the present invention is constructed as described above, and has the following effects.

(a) Since the core and outer molds 4b, 4c are inclined with respect to the relative molding boxes, the discharging of the excess slurry can be done smoothly even if the molding boxes or the molding machine as a whole is not tilted. This enables a molded product P of a uniform thickness to be formed, and a molding box to be positioned easily during a molding box fixing operation.

(b) Since the mold parting and shock absorbing springs are provided on the molding boxes, an impact occurring when the molding boxes are brought into contact with one another during a mold clamping operation is lessened, and all the molding boxes are separated simultaneously when the molds are released from the mold clamping force.

Accordingly, the bad influence of the water, which returns from the porous members in the outer molds, upon the molded products can be prevented.

(c) Since a plurality of molding boxes 4, 4-1, 4-2 . . . 4-n are clamped at once by a single hydraulic unit 5, the construction of the mold clamping unit is simplified, and the operation efficiency is improved.

(d) The hydraulic unit 5 consists of the large-diameter hydraulic cylinders 5b and a small-diameter hydraulic cylinder 5c, and the main cylinders 5b are operated only in a final stage, in which the molds are pressed by a large force, of a mold clamping operation. Accordingly, even when the hydraulic pump 5d of a comparatively small capacity is used, the time required to move the molding boxes 4-1, 4-2 . . . 4-n is reduced, and the operation efficiency can be improved.

(e) Since the molding boxes are suspended from the horizontal frame 3 in the apparatus body, the laterally and longitudinally movable carriage can be driven to a position below a molding box, and the molded product can be transferred from the core mold 4b directly onto the molded product receiving table. This prevents the deformation and breakage of a molded product during a molded product removing operation. Therefore, the yield of the molded products can be increased, and the manual work can be minimized.

(f) The core mold 4b which supports a molded product P after the molds have been parted is provided on the opposite side of the hydraulic unit 5. Accordingly, a molding box transfer operation, in which molded boxes supporting molded products P therein are transferred, and in which the falling of the molded products may occur, can be dispensed with.

It is apparent that many modifications and variations of this invention as hereinbefore set forth may be made without departing from the spirit and scope thereof.

The specific embodiments described are given by way of example only and the invention is limited only by the terms of the appended claims.

For example, the plurality of movable molding boxes each of which forms the split mold may be movably mounted on a frame structure other than by suspension from the horizontal frame.

We claim:

1. An apparatus for pressure molding ceramic articles comprising:
   (a) a frame structure supporting a hydraulic cylinder at one longitudinal end thereof and including a molding box supporting member at the other longitudinal end thereof, a piston and piston rod being reciprocably mounted in the cylinder,
   (b) a plurality of molding boxes which are mounted in parallel longitudinally on said frame structure, each of the molding boxes having a flat bottom in a horizontal plane, said molding boxes being interposed between the piston rod and said molding box supporting member, each of said molding boxes comprising a core mold and an outer mold on respective sides thereof, said core mold and said outer mold each defining together with, respectively, an outer mold of one adjacent molding box and a core mold of another adjacent molding box, a pair of adjacent split molds, a pressure mold cavity being defined in each of said split molds when closed, each of said cavities having a bottom surface thereof inclined longitudinally and laterally relative to a horizontal plane, each of said each split molds further having a passage for supplying a slip into said pressure mold cavity, said passage communicating with the lowermost extremity of said bottom surface of said pressure mold cavity, each of said passages passing through the respective split mold and being longitudinally aligned and in communication with the respective passages of the adjacent pair of split molds when the split molds are closed, and
   (c) a plurality of shock-absorbing and mold-separating spring means a respective one of which is disposed between each pair of adjacent mold boxes, whereby, upon generation of a clamping force by said hydraulic cylinder, said clamping force is transmitted to all of said split molds sequentially from the most adjacent split mold to the most remote split mold relative to said hydraulic cylinder by way of said spring means to define said pressure mold cavities and place the passages of the respective split molds into communication with each other, and, upon releasing of said clamping force of said hydraulic cylinder, said clamping force is released from all of said split molds and all the split molds are opened simultaneously by means of the compression force of said springs enabling simultaneous access to ceramic articles molded in all the respective cavities.

2. An apparatus for pressure molding ceramic articles according to claim 1, wherein said frame structure comprises a horizontal frame, each of said molding boxes is suspended from said horizontal frame by means of a respective suspension frame, and the apparatus further comprises means for moving said molding boxes independently from each other after said release of said clamping force and consequent opening of the split molds by the spring means.

3. An apparatus for pressure molding ceramic articles according to claim 2, wherein each of said spring means comprises a spring inserting cylinder which is formed in one side wall of each of said suspension frames with an opening thereof on the same plane as a surface of said side wall, a spring mounting rod which is extendably and retractably disposed in said spring inserting cylinder, and a spring which is wound around said spring mounting rod and applies a biasing force to said rod thereby to make the distal end of said rod protrude out of said opening when no compressive load is applied to said spring.

4. An apparatus for pressure molding ceramic articles according to claim 1, further comprising a first container for supplying a slip to the split molds, a second container for receiving excess slip from the split molds, said first and second containers communicating with the mold cavities only through said passages, whereby in each of said split molds, the slip is supplied and discharged through the same respective one of said passages.

* * * * *